(12) United States Patent
Hosaki et al.

(10) Patent No.: US 8,456,684 B2
(45) Date of Patent: *Jun. 4, 2013

(54) IMAGE PROCESSING APPARATUS AND METHOD

(75) Inventors: Kenta Hosaki, Tokyo (JP); Hisashi Ishikawa, Urayasu (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/494,192

(22) Filed: Jun. 12, 2012

(65) Prior Publication Data

US 2012/0250090 A1 Oct. 4, 2012

Related U.S. Application Data

(63) Continuation of application No. 12/234,746, filed on Sep. 22, 2008, now Pat. No. 8,223,368.

(30) Foreign Application Priority Data

Oct. 10, 2007 (JP) ................................. 2007-264969

(51) Int. Cl.
*G06F 15/00* (2006.01)
(52) U.S. Cl.
USPC ........................................................ 358/1.15
(58) Field of Classification Search
USPC ........................................................ 358/1.15
See application file for complete search history.

(56) References Cited

U.S. PATENT DOCUMENTS

| 5,115,241 | A | 5/1992 | Ishikawa |
| 5,436,981 | A | 7/1995 | Ishikawa |
| 6,084,984 | A | 7/2000 | Ishikawa |
| 6,985,246 | B2 | 1/2006 | Utsunomiya |
| 7,379,201 | B2 | 5/2008 | Utsunomiya |
| 7,432,985 | B2 | 10/2008 | Ishikawa et al. |
| 8,223,368 | B2 * | 7/2012 | Hosaki et al. ................ 358/1.15 |
| 2003/0131083 | A1 * | 7/2003 | Inui et al. ...................... 709/221 |
| 2005/0025374 | A1 | 2/2005 | Ishikawa |
| 2006/0228035 | A1 | 10/2006 | Ishikawa |
| 2008/0186541 | A1 | 8/2008 | Takasaka et al. |
| 2008/0266581 | A1 | 10/2008 | Ishikawa et al. |

FOREIGN PATENT DOCUMENTS

| JP | 08-096112 A | 4/1996 |
| JP | 09-307725 A | 11/1997 |
| JP | 10-11388 A | 1/1998 |
| JP | 2002-008002 A | 1/2002 |

OTHER PUBLICATIONS

Office Action issued on Sep. 10, 2012, in counterpart Japanese Application No. 2011-260981.

* cited by examiner

*Primary Examiner* — Saeid Ebrahimi Dehkordy
(74) *Attorney, Agent, or Firm* — Fitzpatrick, Cella, Harper & Scinto

(57) ABSTRACT

An apparatus for executing image processing by a plurality of serially connected image processing modules stores, in memory, set values for the plurality of image processing modules and image data to be processed by the plurality of image processing modules, adds headers to respective ones of the set values and image data that have been read out of the memory and transmits the result to a top image processing module among the plurality of image processing modules.

12 Claims, 10 Drawing Sheets

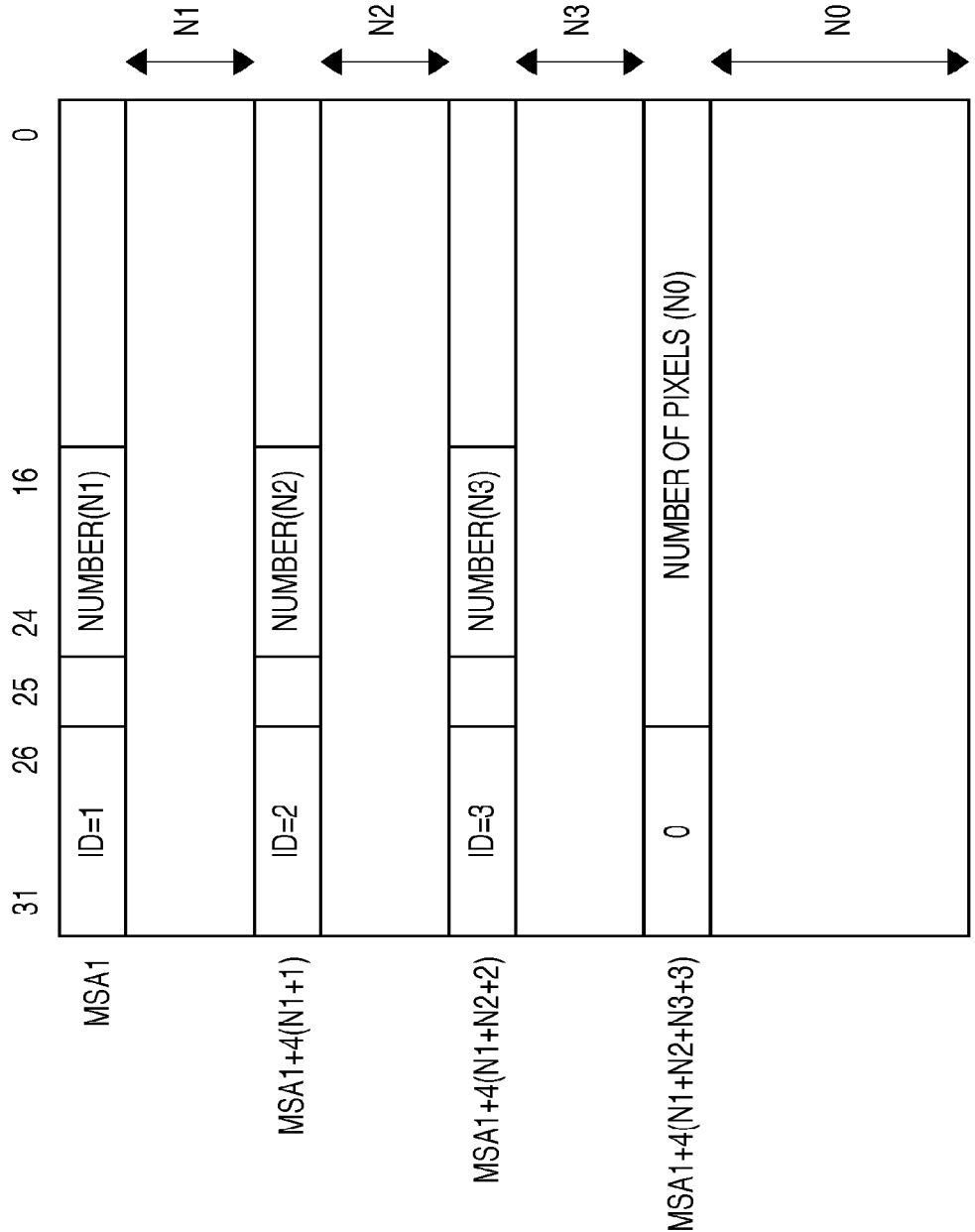

IMAGE PROCESSING APPARATUS AND METHOD

RELATED APPLICATION

This application is a continuation of application Ser. No. 12/234,746, filed Sep. 22, 2008. It claims benefit of that application under 35 U.S.C. §120, and claims benefit under 35 U.S.C. §119 of Japanese Patent Application No. 2007-264969, filed Oct. 10, 2007. The entire contents of each of the mentioned prior applications are incorporated herein by reference.

BACKGROUND OF THE INVENTION

1. Field of the Invention

The present invention relates to an image processing apparatus and method.

2. Description of the Related Art

An image processing module generally has two types of interface, namely a CPU interface for setting a register and a data interface for inputting and outputting image data. In order for control to be performed by the CPU interface, such an image processing module requires execution of the following sequence:

notifying the CPU of end of image processing by an interrupt after a series of image processes ends; and starting the next image processing operation after the setting of a register for the purpose of the next process.

Further, in a case where a change in the CPU is accompanied by a change in the CPU interface, the image processing module must be re-fabricated or the interface must be converted as by a wrapper.

In order to solve these problems, a method of putting data for setting a register and image data to be processed in the form of commands and transferring the commands on the same path has been proposed. The flow of processing according to this method will be described with reference to FIG. 1.

FIG. 1 is a block diagram of an image processor for executing a series of image processing operations. Shown in FIG. 1 are a CPU 701; DMACs 702, 706 for controlling DMA transfer; image processing modules 703 to 705 (modules A to C); a memory controller 707; and a memory 708. A gamma correction circuit and color conversion circuit, etc., can be mentioned as the image processing modules 703 to 705. "DMA" is the abbreviation of "Direct Memory Access".

Before the start of image processing or in predetermined units of processing, the CPU 701 generates a register command for reading and writing from and to a register in each image processing module, or a data command containing pixel data.

FIGS. 2A and 2B illustrate specific examples of formats of these commands. As shown in FIG. 2A, the register command contains header information, a register address and a register set value. The header information includes a command identification bit, a module ID and a read/write identification bit. The command identification bit indicates whether the command is a register command or a data command. For example, the command is a register command if the command identification bit is "1" and is a data command, which is shown in FIG. 2B, if the command identification bit is "0". The image processing modules determine whether the command type is the register command or data command by referring to the command identification bit. The module ID indicates in which image processing module the register command will be set. By referring to the module ID, the image processing module determines whether the received register command is for setting its own register. The read/write identification bit represents whether the register command is a read or write command. For example, the register command is register write (register write command) if the read/write identification bit is "1" and register read (register read command) if the read/write identification bit is "0".

On the other hand, as illustrated in FIG. 2B, the header information of the data command includes a command identification bit having a value of "0" indicative of the data command, and an image control signal such as a data-start bit and a data-end bit. The CPU 701 stores the created command in memory 708.

Further, the CPU 701 also puts image data in the form of a command and stores it in the memory 708 as a data command. When a command in a prescribed unit of processing is stored in the memory 708, the CPU 701 sets an access address, which is for accessing the memory 708, in the registers of the DMACs 702 and 706 and starts operating.

The DMAC 702 reads in commands from the memory 708 successively and transfers the commands to image processing module A. In a case where the image processing module B (704) and image processing module C (705) have determined that an entered command is the register write command and, moreover, that the command is directed at itself as determined from the module ID, a register setting is performed. When the accepted command is the register read command, a value read from the target register indicated by the register address is set as the register set value of the read command and is transferred to the next image processing module. When the received command is the data command, processing is executed using this data, the result of processing is set in the data command and the command is transferred to the next image processing module. The DMAC 706 accepts the command that has been output from the image processing module C (705) and writes the command to the memory 708.

Thus, it is so arranged that setting of a register and data input can be set from the same port. This means that any sequence can be executed without a CPU interrupt. A further advantage is that even if there is a change in the CPU interface, no change whatsoever is required of the image processing modules.

Further, Japanese Patent Application Laid-Open No. 10-011388 describes a DMA control apparatus having a controller for generating transfer-source and transfer-destination addresses in order to lighten the CPU load.

However, in a case where it is so arranged that header information other than a register set value and addresses are stored in the memory 708, a large memory capacity and transmission band are required. As a consequence, needless memory capacity and transmission band are consumed. Further, in a case where it has been arranged to put image data in command form and store the command, the task of converting the image data to a command is required of the CPU 701 and the load on the CPU is increased. Furthermore, the task relating to the conversion to a command is not overcome even if the DMA control apparatus of Japanese Patent Application Laid-Open No. 10-011388 is applied.

SUMMARY OF THE INVENTION

An object of the present invention is to operate an image processing module with a memory having a small memory capacity and small transmission band.

Another object of the present invention is to alleviate CPU load.

A further object of the present invention is to provide an image processing apparatus comprising: a plurality of serially connected image processing units; a storage unit configured to store set values for the plurality of image processing units and image data to be processed by the plurality of image processing units; and a transmission unit configured to add headers to respective ones of the set values and image data that have been read out of the storage unit and to transmit the result to a top image processing unit among the plurality of image processing units.

A further object of the present invention is to provide a method of executing image processing by a plurality of serially connected image processing modules, the method comprises: a storage step of storing, in memory, set values for the plurality of image processing modules and image data to be processed by the plurality of image processing modules; and a transmission step of adding headers to respective ones of the set values and image data that have been read out of the memory and transmitting the result to a top image processing module among the plurality of image processing modules.

Further features of the present invention will become apparent from the following description of exemplary embodiments with reference to the attached drawings.

BRIEF DESCRIPTION OF THE DRAWINGS

FIG. 5B is a diagram illustrating storage of header information necessary in order to store register set values and pixel data, which have been transmitted from an image processing module, in a memory;

DESCRIPTION OF THE EMBODIMENTS

Exemplary embodiments of the present invention will now be described in detail in accordance with the accompanying drawings.

Figure 3:
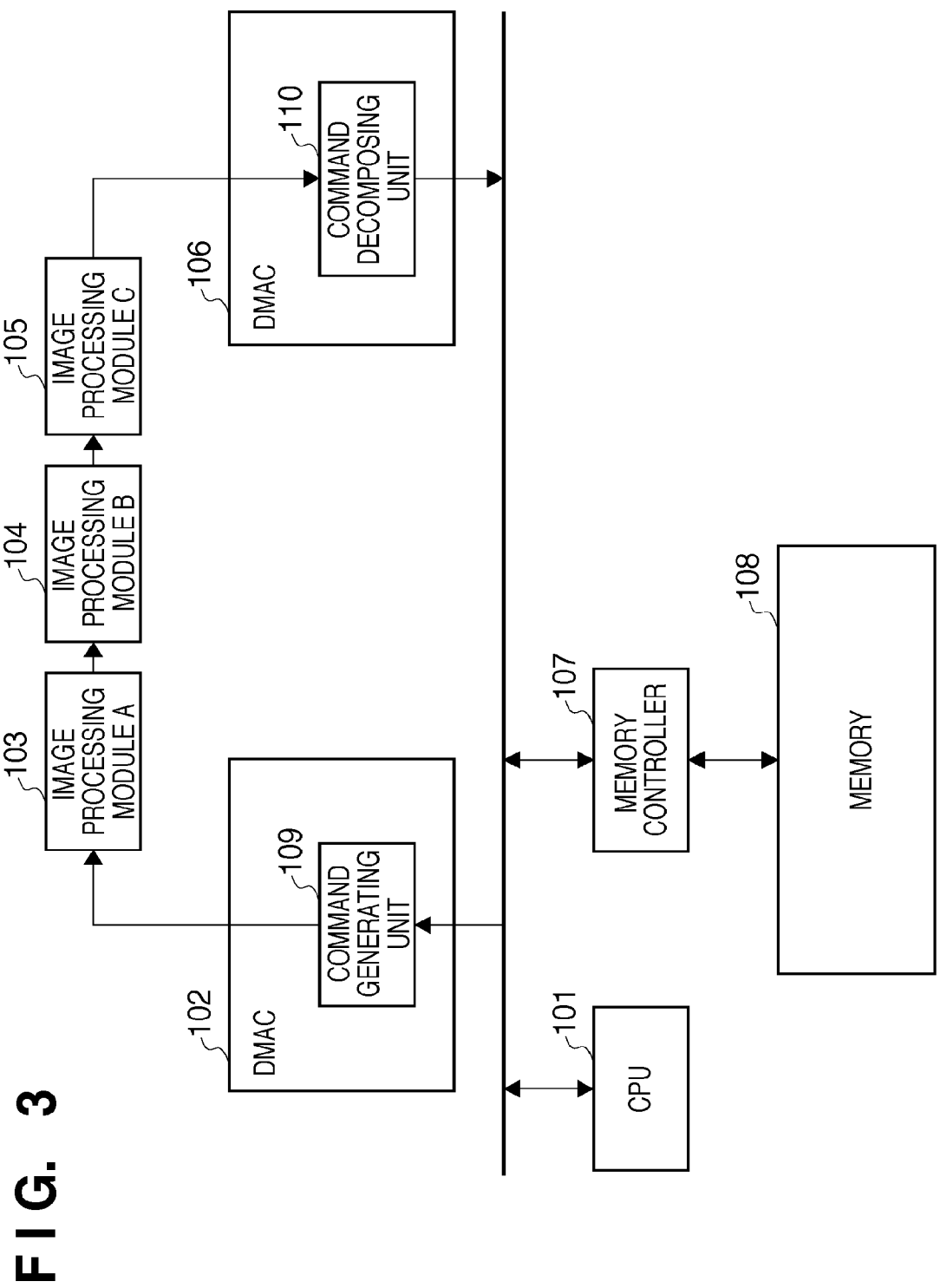
FIG. 3 is a block diagram illustrating the configuration of an image processing apparatus according to an embodiment.

FIG. 3 is a block diagram illustrating the configuration of an image processing apparatus according to an embodiment. Shown in FIG. 3 are a CPU 101; DMACs 102, 106; image processing modules 103 to 105 (modules A to C); a memory controller 107; a memory 108, a command generating unit 109 and a command decomposing unit 110. Although FIG. 3 illustrates a case where there are three image processing modules, the number of image processing modules may be four or more or two or less.

The CPU 101 stores register set values and image data in the memory 108. Register set values and image data will also be referred to generically as "data to be processed" below. The DMAC 102 reads the data to be processed out of the memory 108 by direct memory access. Using the read data to be processed (register set values or image data), the command generating unit 109 generates commands of the kind shown in FIGS. 2A and 2B. The DMAC 102 transfers the command generated by the command generating unit 109 to the image processing module A (103). The command generating unit 109 within the DMAC 102 generates a command by adding control information, which is for making the conversion to a command, to a register set value or image data that has been read out of the memory 108.

Figure 1:
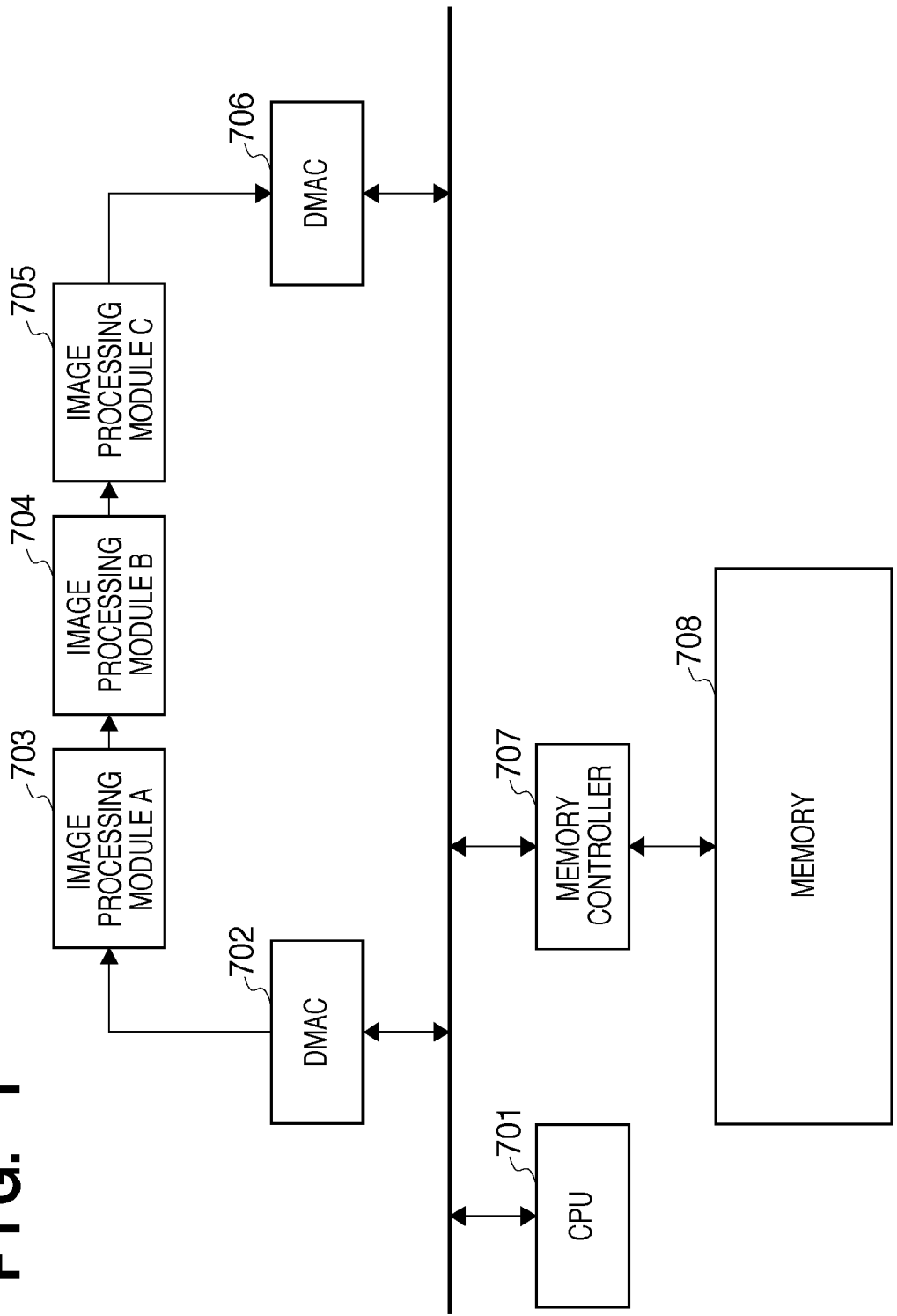
FIG. 1 is a block diagram illustrating the configuration of an image processing apparatus.
Figure 2A:
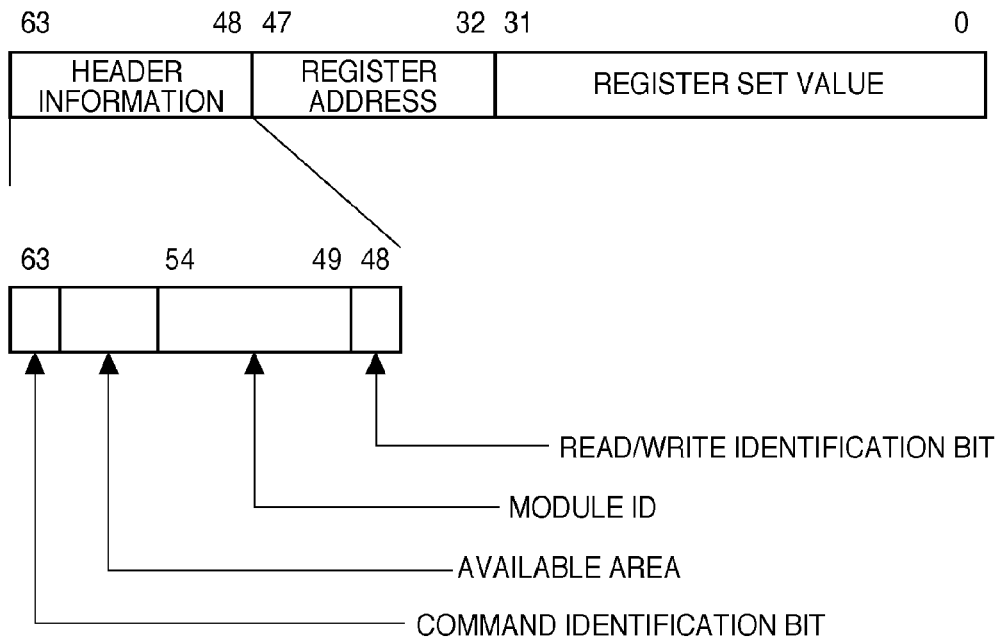
FIGS. 2A and 2B are diagrams illustrating the formats of commands according to an embodiment.
Figure 2B:
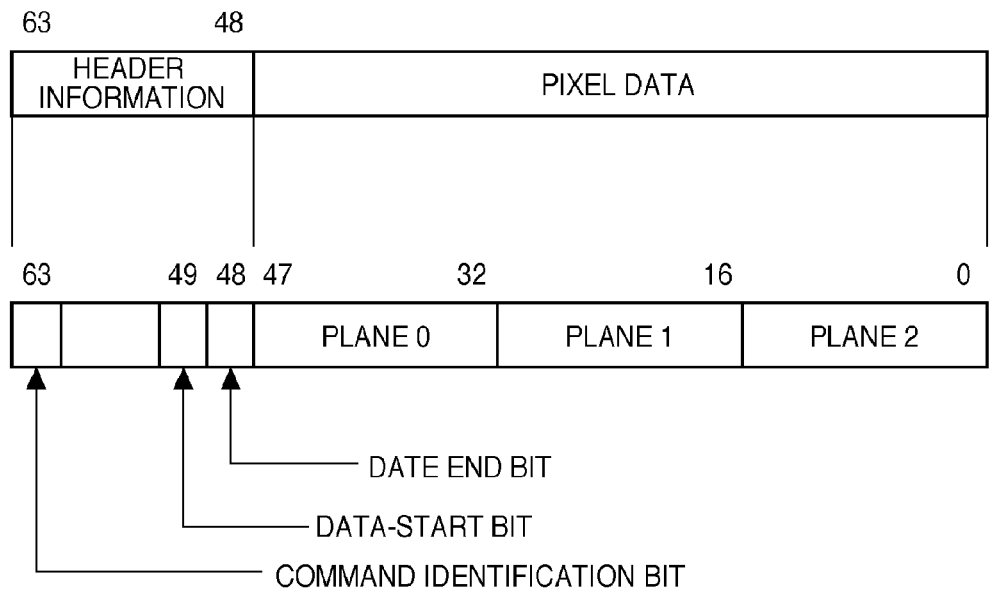

As illustrated in FIG. 2A, control information for a register command is composed of header information and a register address. Control information for a data command is composed of header information, as shown in FIG. 2B. The image processing module A (103), image processing module B (104) and image processing module C (105) execute prescribed processing in accordance with the command that is input thereto. Specifically, these image processing modules process the commands, which are shown in FIGS. 2A, 2B, having a form in which the control information has been added to the register set value or pixel data. A gamma correction circuit and color conversion circuit, etc., can be mentioned as examples of such image processing modules.

Further, the DMAC 106 transfers a register set value and pixel data to the memory controller 107 and writes these to the memory 108. The command decomposing unit 110 within the DMAC 106 decomposes a command that has been received from the image processing module C (105) and generates a register set value or pixel data. That is, the DMAC 106 functions as a second transmission unit for writing, to memory 108, a register set value or pixel data extracted by the command decomposing unit 110 from a processed command that has been output from the image processing module C (105).

Figure 4:
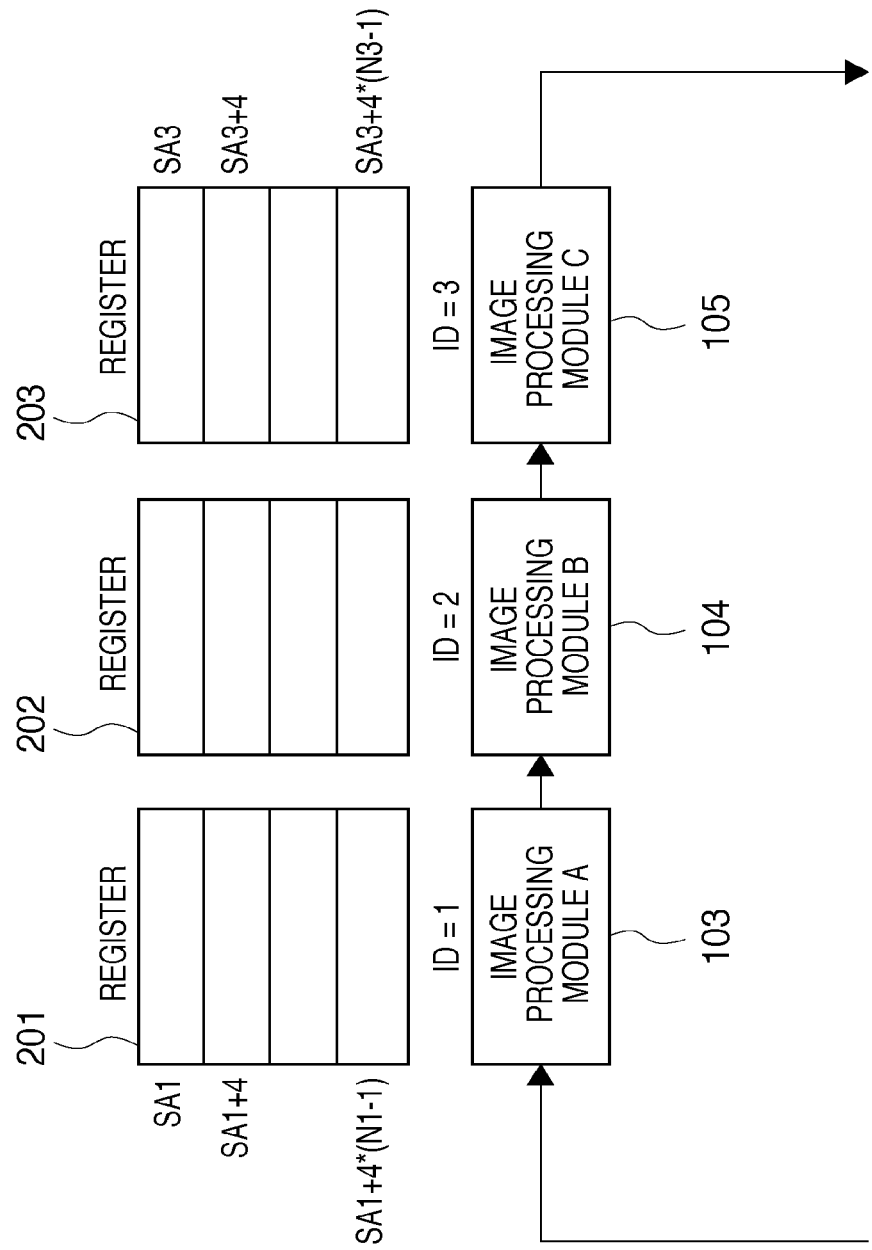
FIG. 4 is a diagram useful in describing register addresses of image processing modules according to an embodiment.

Before a detailed description is given, the registers of an image processing module in which a register setting in accordance with a register command is to be made will be described. FIG. 4 is a diagram explaining register configuration of the image processing modules. Assume that the ID of the image processing module A (103) is 1, that the starting address of a register is SA1 and that the number of registers is N1. Similarly, assume that the ID of the image processing module B (104) is 2, that the starting address of a register is SA2 and that the number of registers is N2. Furthermore, assume that the ID of the image processing module C (105) is 3, that the starting address of a register is SA3 and that the number of registers is N3. Assume also that the data width of a register set value is 32 bits. In this embodiment, it is assumed that eight bits are allocated to one address.

Figure 5A:
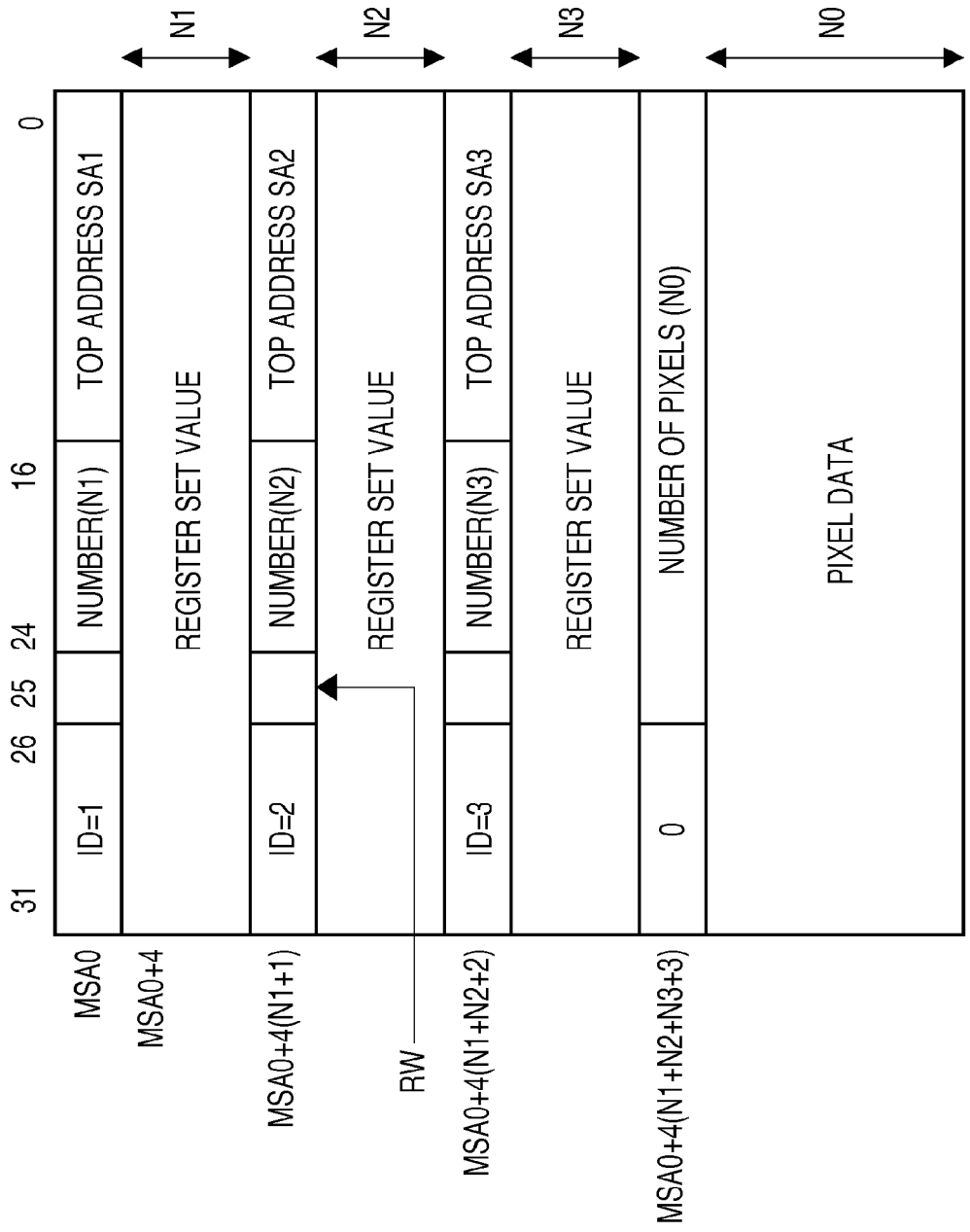
FIG. 5A is a diagram illustrating storage by a CPU of register set values and pixel data in a memory.

Next, reference will be had to FIGS. 5A and 5B to describe the manner in which data necessary for generating a command is stored in the memory 108 by the CPU 101. In a case where a register set value is stored in the memory 108, header information is stored first before the register set value is stored. Specifically, as indicated at MSA0, MSA0+4(N1+1), ... in FIG. 5A, 32-bit control information is stored as the header information and contains the following:

module ID from the $31^{st}$ bit to the $26^{th}$ bit; a read/write bit at the $25^{th}$ bit (the command is assumed to be a write command when this bit is "1" and a read command when this bit is "0");

number of registers from the $24^{th}$ bit to the $16^{th}$ bit; and top address of the register from the $15^{th}$ bit to the $0^{th}$ bit.

Register set values, which are data to be processed in the image processing module, are stored from the next memory address and the number thereof is equivalent to the number of registers mentioned above.

On the other hand, in a case where pixel data is stored, 32-bit control information is stored as the header information, as indicated at memory address MSA0+4(N1+N2+N3+3), and contains the following:

0 as module ID from the $31^{st}$ bit to the $26^{th}$ bit; and
number of input pixels from the $25^{th}$ bit to the $0^{th}$ bit.

Pixel data, which is data to be processed in the image processing module, is stored from the next memory address and the number of items thereof is equivalent to the number of pixels.

Thus, as illustrated in FIG. 5A, data used in generating control information for converting data to a command and data to be processed and that is to be transferred are stored in continuous address space of memory 108 such as at MSA0 to MSA0+4*(N1). Continuous address space in memory for storing data used in generating control information and data to be processed and that is to be transferred, such as indicated in FIG. 5A, will also be referred to as a "first address space" below.

Next, the CPU 101 stores header information in the memory 108. The header information is necessary in order to store data read out of the image processing module C (105) by the DMAC 106 in the memory 108. That is, in a case where register set values are stored, the following are stored as indicated at memory addresses MSA1, MSA1+4(N1+1), ... in FIG. 5B:

module ID from the $31^{st}$ bit to the $26^{th}$ bit; and
number of registers from the $24^{th}$ bit to the $16^{th}$ bit.

On the other hand, in a case where pixel data are stored, the following are stored as indicated at memory addresses MSA1+4(N1+N2+N3+3) in FIG. 5B:

0 as module ID from the $31^{st}$ bit to the $26^{th}$ bit; and
number of input pixels from the $25^{th}$ bit to the $0^{th}$ bit.

Further, as illustrated in FIG. 5B, a continuous address space for storing the register and pixel data in the numbers indicated by the control data is reserved following the address storing the header information.

Thus, data indicating the data amount of register set values or pixel data to be stored successively is stored over a prescribed address range at the beginning of the continuous address space of memory 108. A memory area having a size corresponding to this data amount is reserved following the prescribed address range within the continuous address space. It should be noted that this continuous address space in the memory will also be referred to as a "second address space" below.

Next, the CPU 101 sets memory address MSA0 in the register of DMAC 102 and sets memory address MSA1 in the register of DMAC 106. Thus, the CPU 101 functions as a first storage unit that stores data for control-information generation in a prescribed address range at the beginning of the first address space of memory 108 and that stores data to be processed in an area that follows the prescribed address range. The CPU 101 sets the top address MSA0 of the first address space in the DMAC 102 as the starting address of direct memory access. Further, the CPU 101 functions as a second storage unit that stores control information, which indicates the data amount to be stored from now onward, in a prescribed address range at the beginning of the second address space of memory 108, and that reserves a area corresponding to the above-mentioned data amount following the prescribed address range of the second address space. The CPU 101 sets a top address MSA1 of the second address space in the DMAC 106 as the starting address of direct memory access.

After operation starts, the DMAC 102 sets the memory address MSA0, which has been set in the register, in an address counter within the DMAC 102. Owing to such processing, the DMAC 102 reads the data to be processed out of the first address space of memory 108 successively by direct memory access. The command generating unit 109 adds control information onto the data to be processed that has been read out, thereby generating a command capable of being processed by an image processing module, and transmits the command to the image processing module A (103). That is, the DMAC 102 and command generating unit 109 construct a first transmission unit for converting the data to be processed, which has been read out out of the memory 108, to a command and transmitting the command to the image processing module A (103).

Next, processing for generating a command by the command generating unit 109 within the DMAC 102 will be described in detail with reference to the flowchart shown in FIG. 6.

Figure 6:
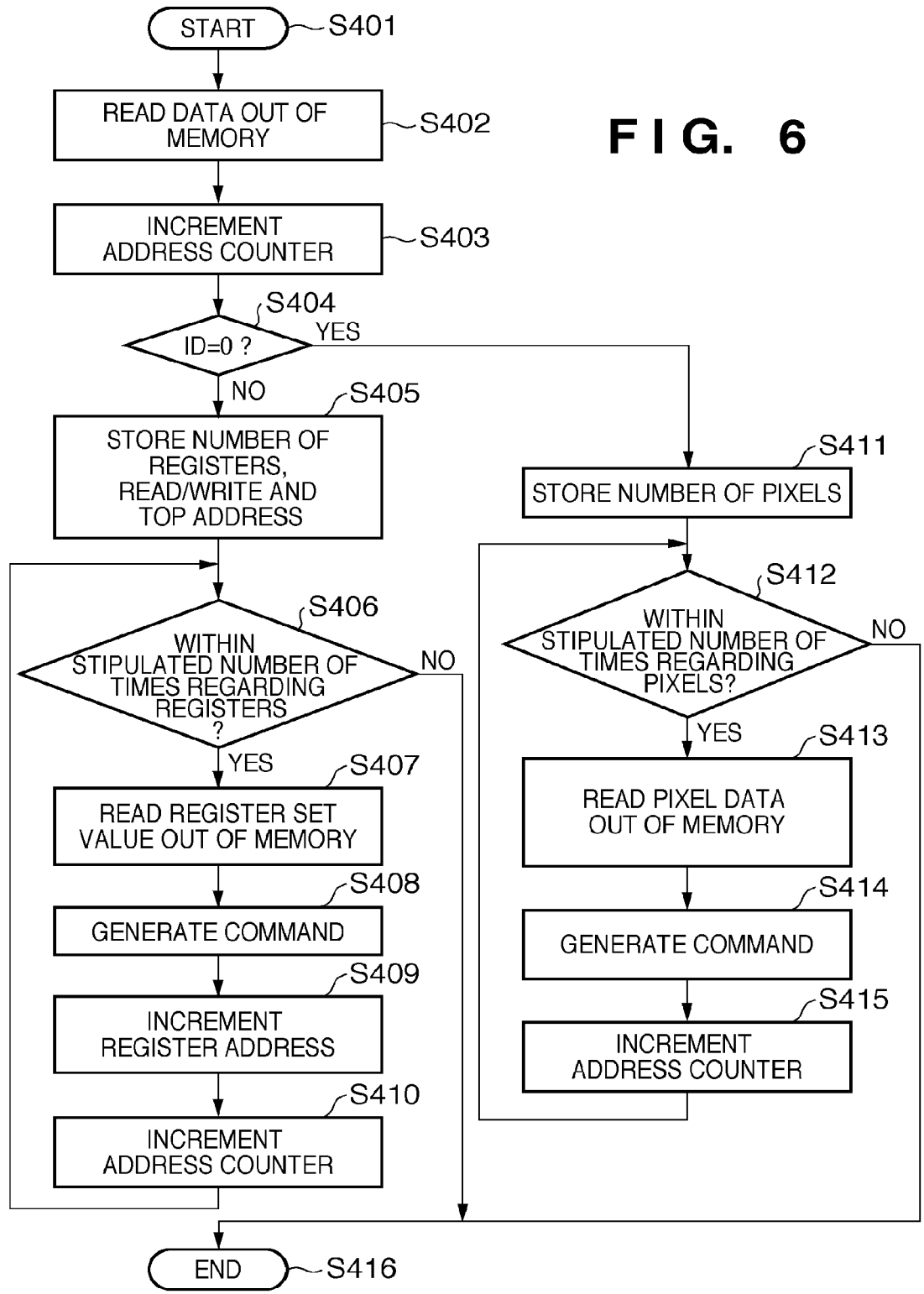
FIG. 6 is a flowchart illustrating command generation processing by a command generating unit according to an embodiment.

In FIG. 6, the DMAC 102 starts register setting processing (step S401). The DMAC 102 then reads data from a memory address of memory 108 indicated by the address counter and stores this data in a register (not shown) possessed by the DMAC 102 (step S402). As a result of this processing, header information is stored in the register of the DMAC 102. The address counter is then incremented (step S403).

Next, the command generating unit 109 determines whether the module ID in the header information stored in the register at step S402 is 0 or not (step S404). If the module ID is not 0, then the command generating unit 109 decides that the command is a register command (FIG. 2A). In this case, the data that has been read out of the memory 108 is module ID, value of the read/write identification bit, number of registers and register address. Accordingly, the command generating unit 109 stores the module ID, the value of the read/write identification bit, the number of registers and the register address in its own register (step S405).

Next, the command generating unit 109 determines whether the subsequent processing (steps S407 to S410) has been executed a stipulated number of times (step S406). In this embodiment, the data of one register is 32 bits (FIG. 5A) and four addresses are necessary. Therefore, 4×(number of registers stored at step S405) is the stipulated number. If the number of processing cycles has reached the stipulated number, the processing according to this flowchart is exited (step S416). If the number of processing cycles has not reached the stipulated number, on the other hand, then the command generating unit 109 reads data (a register set value) from the memory address of memory 108 indicated by the address counter (step S407). The command generating unit 109 then generates a register command having the format of FIG. 2A using the module ID, read/write bit value and register address stored at step S405 (step S408). The command generating unit 109 then increments the register address (step S409) and increments the address counter (step S410). Processing then returns to step S406.

As mentioned above, the control information added onto a register set value includes the register address of the storage location of this register set value in the image processing module. Accordingly, when the first command is generated, the command generating unit 109 decides the first register address based upon the control data (steps S405, S408). With regard to register addresses of commands from the second onward, use is made of a value obtained by adding a prescribed value to the register address included in the control information of the immediately preceding command (step S409).

On the other hand, if it is determined at step S404 that the module ID is 0, then the command generating unit 109 acquires the number of pixels as a data command from the applicable header information and stores the number in its own register (step S411). Next, the command generating unit 109 determines whether the subsequent processing (steps S413 to S415) has been executed a stipulated number of times (step S412). Here the stipulated number is a value obtained by dividing "number of pixels" by "number of pixels stored at one address", by way of example. In this embodiment, since one pixel has 48 bits, as shown in FIG. 5B, six addresses are necessary and 6×(number of pixels stored at step S411) is the stipulated number. The command generating unit 109 ends processing if the stipulated number is attained (step S416).

In a case where it is determined at step S412 that the stipulated number has not been attained, the command generating unit 109 then reads data from the memory address indicated by the address counter (step S413) and generates a data command having the format of FIG. 2B (step S414). It should be noted that in the creation of the command at step S414, the command generating unit 109 refers to the number of times the loop at step S412 is executed, sets the data-start bit to "1" at creation of the data command of the initial pixel and sets the data-start bit to "0" with respect to data commands of other pixels. Further, with respect to the data command of the final pixel, the command generating unit 109 sets data end to "1" and sets data end to "0" with respect to data commands of other pixels. Next, the command generating unit 109 increments the address counter (step S415). Control then returns to step S412.

Figure 7:
FIG. 7 is a diagram illustrating a list of commands generated by a command generating unit as well as the sequence of generation according to an embodiment.

An example of commands generated by the above-described processing is illustrated in FIG. 7. The order in which commands are generated and transmitted is indicated by the arrow in FIG. 7. Headers 1 to 3 are headers for register commands (FIG. 2A), and "1" is stored as the command identification bit. Further, values 1, 2, 3 are stored as module IDs of the headers 1 to 3, and "1" indicative of "write" is stored as the read/write identification bit. Here it is assumed that the CPU 101 has stored "1", indicative of "write", in a storage area of the read/write identification bit of memory 108 in order to perform the register setting. Further, header (DS), header (D) and header (DE) represent the headers of the respective data commands, and "0" has been stored as the command identification bit. Further, as flags for data control, data start="1" and data end="0" have been stored in the header (DS), data start="0" and data end="0" have been stored in the header (D), and data start="0" and data end="1" have been stored in the header (DE).

As mentioned above, on the basis of the data that has been stored in the prescribed address range at the beginning of the first address space, the command generating unit 109 generates control information for changing a register set value or pixel data within the first address space to a command. By adding data to be processed, which has been read out from the prescribed address range onward in the first address space, onto the control information, the command generating unit 109 converts the data to a command and transmits the command to the image processing module A (103).

The generated command is transmitted to the image processing module A (103), passes through all of the image processing modules and the register setting is performed.

After operation of the DMAC 106 starts, the memory address MSA1 set in the register beforehand is set in the address counter within the DMAC 106.

Next, the command decomposing unit 110 within the DMAC 106 executes command decomposing processing. This processing will be described with reference to the flowchart of FIG. 8.

Figure 8:
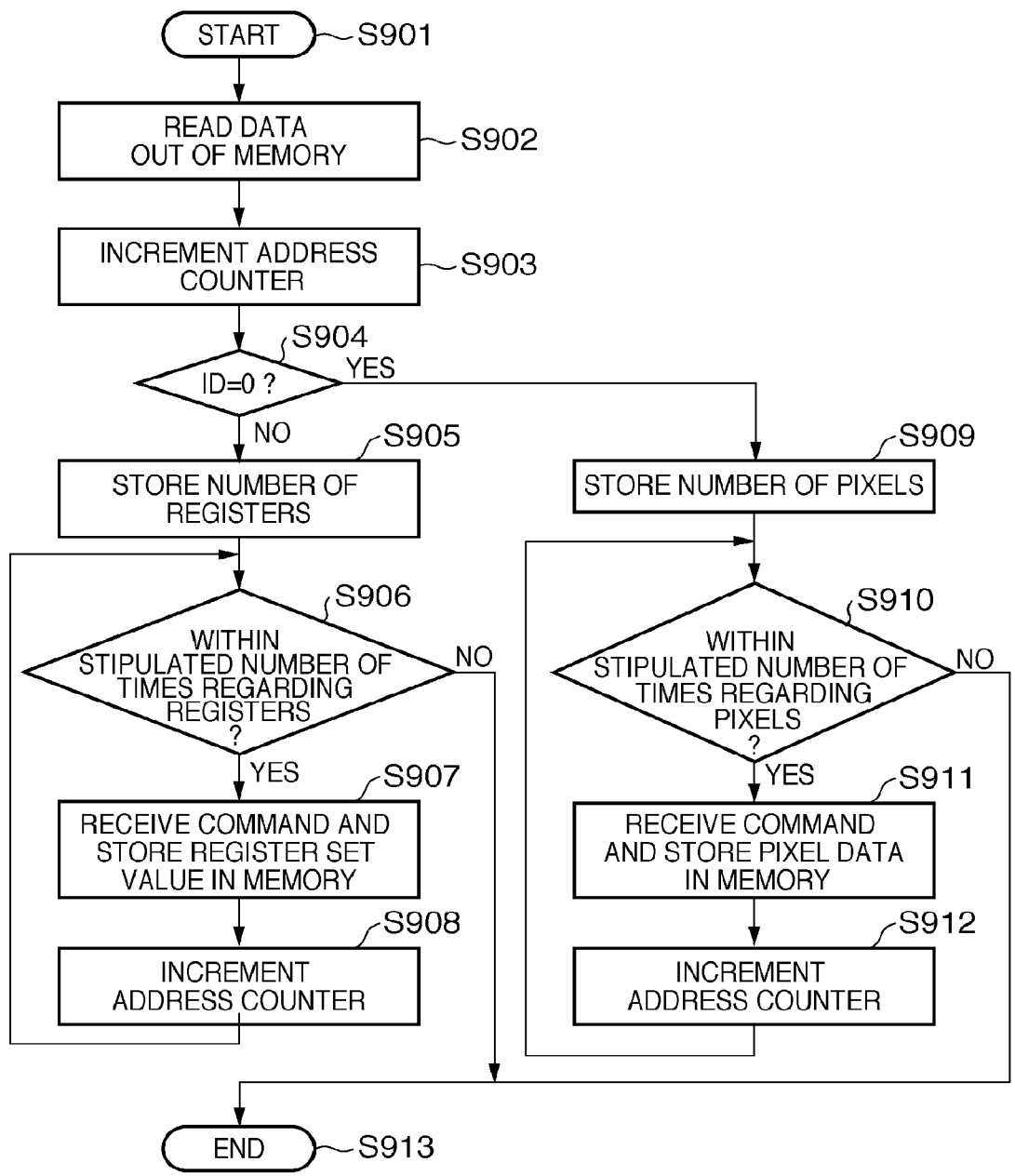
FIG. 8 is a flowchart illustrating command decomposition processing by a command decomposing unit according to an embodiment.

In FIG. 8, the command decomposing unit 110 within the DMAC 106 starts command decomposing processing (step S901), reads data from the memory address of memory 108 indicated by the address counter and stores this data in its own register (not shown) (step S902). Here the data read out and stored is the header information at address MSA1 shown in FIG. 5B. Next, the command decomposing unit 110 increments the address counter (step S903).

Next, the command decomposing unit 110 determines whether the module ID of the header information stored at step S902 is 0 (step S904). If the module ID is not 0, the command decomposing unit 110 determines whether this header information relates to a register command. The command decomposing unit 110 then reads out the value represented by the $16^{th}$ to $24^{th}$ bits of the header information of the module ID stored in the memory 108 of FIG. 5B and stores the value in the register of the DMAC 106 as the number of registers (step S905). Next, the command decomposing unit 110 determines whether the subsequent processing (steps S907 and S908) has been executed a stipulated number of times (step S906). The stipulated number is similar to that described at step S406. If the number of processing cycles has reached the stipulated number, the processing according to this flowchart is exited (step S913). If the number of processing cycles has not reached the stipulated number, the command decomposing unit 110 continues processing. That is, the command decomposing unit 110 receives the command from the image processing module C (105) and stores the register set value within this command at the memory address indicated by the address counter (step S907). The command decomposing unit 110 then increments the address counter (step S908) and processing returns to step S906.

On the other hand, if it is determined at step S904 that the module ID is 0, then the command decomposing unit 110 stores the value that has been recorded at bits 0 to 25 of the applicable header information stored in memory 108 shown in FIG. 5B in the register of the DMAC 106 as the number of pixels.

Next, the command decomposing unit 110 determines whether the subsequent processing (steps S911 and S912) has been executed a stipulated number of times (step S910). The stipulated number is similar to that described at step S412. If the number of processing cycles has reached the stipulated number, the processing according to this flowchart is exited (step S913). If the number of processing cycles has not reached the stipulated number, then the command decomposing unit 110 receives the command from the image processing module C (105) and stores the pixel data within this command at the memory address of memory 108 indicated by the address counter. The command decomposing unit 110 then increments the address counter (step S912) and processing returns to step S910.

Thus, the DMAC 106 and the command decomposing unit 110 extract data from commands output successively from the image processing module C (105) and store the data successively in the second address space of memory 108. The extraction and storing processing is repeated a number of times decided based upon the data amount (number of registers and number of pixels) acquired at step S905 or step S909.

Figure 9:
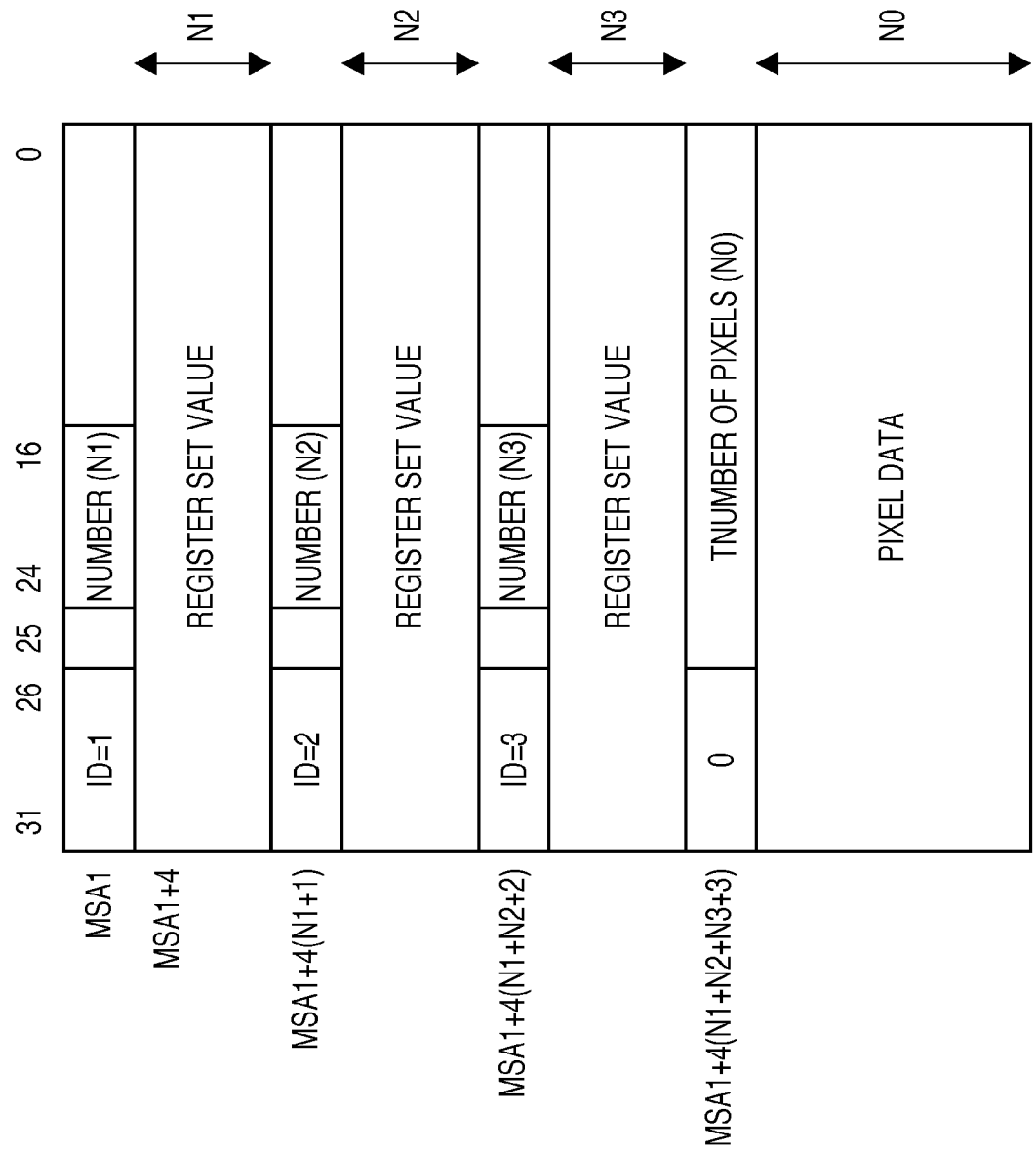
FIG. 9 is a diagram illustrating storage in memory of register set values and pixel data that have been input from an image processing module.

FIG. 9 illustrates how register set values and image data have been stored in memory 108 by the above-described processing. Specifically, register set values and pixel data of commands received from the image processing module C (105) are stored in the address space of memory 108, which has been prepared as shown in FIG. 5B, by the DMAC 106 in the manner illustrated in FIG. 9.

By thus adopting an arrangement in which the DMAC 102 performs command generation and the DMAC 106 performs command decomposition, there is no longer redundant data such as header information stored in a case where commands are stored in memory. As a result, it is possible to reduce memory capacity and the transmission band between the DMAC and memory. Further, there is no longer any load upon the CPU 101 in terms of converting register set values and pixel data to commands.

The present invention includes cases where the object of the invention is attained also by supplying a software program directly or remotely to a system or apparatus, reading the supplied program codes with a computer of the system or apparatus, and then executing the program codes. In this case, the program supplied is a program corresponding to the flowcharts illustrated in the drawings of the embodiment.

Accordingly, since the functional processing of the present invention is implemented by computer, the program codes per se installed in the computer also implement the present invention. In other words, the present invention also covers a computer program that is for the purpose of implementing the functional processing of the present invention.

In this case, so long as the system or apparatus has the functions of the program, the form of the program, e.g., object code, a program executed by an interpreter or script data supplied to an operating system, etc., does not matter.

Examples of recording media for supplying the program are a flexible disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, a client computer can be connected to a website on the Internet using a browser possessed by the client computer, and the computer program of the present invention can be downloaded to a recording medium such as a hard disk. In this case, the program downloaded may be a file that is compressed and contains an automatic installation function. Further, implementation is possible by dividing the program codes constituting the program of the present invention into a plurality of files and downloading the files from different websites. In other words, a WWW server that downloads, to multiple users, the program files that implement the functional processing of the present invention by computer also is included in the present invention.

Further, it is also possible to encrypt and store the program of the present invention on a storage medium such as a CD-ROM and distribute the storage medium to users. In this case, users who meet certain requirements are allowed to download decryption key information from a website via the Internet, the program decrypted using this key information can be executed and the program can be installed on a computer.

Further, besides implementing the functions of the embodiment by executing a read program using a computer, the functions of the embodiment may be implemented in cooperation with an operating system running on a computer, based upon commands from the program. In this case, the operating system, etc., executes some or all of the functions of actual processing and the functions of the above-described embodiment are implemented by this processing.

Furthermore, a program that has been read from a recording medium may be written to a memory provided on a function expansion board inserted into the computer or provided in a function expansion unit connected to the computer, and some or all of the functions of the embodiment may be implemented. In this case, after the program has been written to the function expansion board or function expansion unit, a CPU or the like provided on the function expansion board or function expansion unit performs some or all of the actual processing based upon the indications in the program.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An image processing apparatus comprising:
a plurality of image processing units;
a storage unit for storing set values for said plurality of image processing units and image data to be processed by said plurality of image processing units;
a first transmission unit configured to read the set values and image data out of first address space of said storage unit using direct memory access, to add headers to the respective set values and image data that have been read out, and to transmit the result to one of said plurality of image processing units; and
a second transmission unit configured to extract image data processed by at least one of the plurality of image processing units from output of said plurality of image processing units, and to transmit the extracted image data to second address space of said storage unit.

2. The apparatus according to claim 1, wherein
each of said plurality of image processing units has a memory unit for storing a plurality of set values,
said storage unit stores top addresses of the respective memory units of said plurality of image processing units and a plurality of set values to be stored in the respective memory units,
said first transmission unit comprises a generation unit which, based upon the top addresses of the respective memory units read out of said storage unit, generates addresses at which the respective plurality of set values read out of the first address space of said storage unit are to be stored, and
said first transmission unit adds headers, which include the addresses generated by said generation unit, to the respective plurality of set values read out of the first address space of said storage unit and transmits the result to a top image processing unit.

3. The apparatus according to claim 1, wherein
each of said plurality of image processing units has a memory unit for storing a plurality of set values,
said storage unit stores a number of set values to be stored in said respective plurality of image processing units, and
said first transmission unit reads set values, the number of which has been stored in said storage unit, out of the first address space of said storage unit.

4. The apparatus according to claim 1, wherein
said storage unit stores the amount of image data, and
said first transmission unit reads the image data out of the first address space of said storage unit upon splitting the read operation a number of times conforming to the amount of data read out of the first address space of said storage unit.

5. An image processing apparatus comprising:
a plurality of image processing units;

a storage unit for storing set values for said plurality of image processing units and image data to be processed by said plurality of image processing units in first address space; and a transmission unit configured to extract image data processed by at least one of said plurality of image processing units from output of said plurality of image processing units, and to transmit the extracted image data to second address space of said storage unit.

6. An image processing apparatus comprising:

a plurality of image processing units;

a storage unit for storing set values for said plurality of image processing units and image data to be processed by said plurality of image processing units in first address space and for storing processed data in second address space; and a first transmission unit configured to read the set values and image data out of first address space of said storage unit using direct memory access, and to add headers to the respective set values and image data that have been read out.

7. A method of executing image processing by a plurality of image processing modules, the method comprising:

a storage step of storing, in memory, set values for the plurality of image processing modules and image data to be processed by the plurality of image processing modules;

a first transmission step of reading the set values and image data out of first address space of the memory using direct memory access, adding headers to the respective set values and image data that have been read out, and transmitting the result to one of the plurality of image processing modules; and a second transmission step of extracting the image data processed by at least one of the plurality of image processing modules from output of the plurality of image processing modules, and transmitting the extracted image data to second address space of the memory.

8. The method according to claim 7, wherein each of the plurality of image processing modules has a register for storing a plurality of set values, said storage step includes storing, in memory, top addresses of the respective registers of the plurality of image processing modules and a plurality of set values to be stored in the respective registers, said first transmission step comprises a generation step which, based upon the top addresses of the respective registers read out of the memory, generates addresses at which the respective plurality of set values read out of the first address space of the memory are to be stored, and said first transmission step includes adding headers, which include the addresses generated in said generation step, to the respective plurality of set values read out of the first address space of the memory and transmitting the result to a top image processing module.

9. The method according to claim 7, wherein each of the plurality of image processing modules has a register unit for storing a plurality of set values, said storage step includes storing a number of set values to be stored in the respective plurality of image processing modules, and said first transmission step includes reading set values, the number of which has been stored in the memory, out of the first address space of the memory.

10. The method according to claim 7, wherein said storage step includes storing the amount of image data in the memory, and said first transmission step includes reading the image data out of the first address space of the memory upon splitting the read operation a number of times conforming to the amount of data read out of the first address space of the memory.

11. A method of executing image processing by a plurality of image processing modules, the method comprising:

a storage step of storing, in a memory, set values for the plurality of image processing modules and image data to be processed by said plurality of image processing modules in first address space; and a transmission step of extracting image data processed by at least one of the plurality of image processing modules from output of the plurality of image processing modules, and transmitting the extracted image data to second address space of the memory.

12. A method of executing image processing by a plurality of image processing modules, the method comprising:

a storage step of storing, in a memory, set values for the plurality of image processing modules and image data to be processed by the plurality of image processing modules in first address space and storing processed data in second address space; and a first transmission step of reading the set values and image data out of the first address space of the memory using direct memory access, and adding headers to the respective set values and image data that have been read out.

* * * * *